(12) United States Patent
Etemad et al.

(10) Patent No.: US 9,883,432 B2
(45) Date of Patent: *Jan. 30, 2018

(54) DELIVERY OF MULTICAST AND BROADCAST SERVICES CONCURRENTLY WITH UNICAST DATA

(71) Applicant: Intel Corporation, Santa Clara, CA (US)

(72) Inventors: Kamran Etemad, Potomac, MD (US); Yujian Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/244,355

(22) Filed: Apr. 3, 2014

(65) Prior Publication Data

US 2014/0293862 A1    Oct. 2, 2014

Related U.S. Application Data

(63) Continuation of application No. 13/154,809, filed on Jun. 7, 2011, now Pat. No. 8,780,876.

(Continued)

(51) Int. Cl.
*H04W 36/06* (2009.01)
*H04W 4/06* (2009.01)
(Continued)

(52) U.S. Cl.
CPC .......... *H04W 36/06* (2013.01); *H04B 17/318* (2015.01); *H04L 1/1822* (2013.01);
(Continued)

(58) Field of Classification Search
CPC ..... H04W 80/04; H04W 88/06; H04W 28/04; H04W 72/04; H04W 84/08; H04W 48/08;
(Continued)

(56) References Cited

U.S. PATENT DOCUMENTS 8,780,876 B2    7/2014    Etemad et al.
9,107,124 B2    8/2015    Etemad et al.
(Continued)

OTHER PUBLICATIONS

Notice of Allowance received for U.S. Appl. No. 13/154,809, dated Mar. 21, 2014, 5 pages.
(Continued)

*Primary Examiner* — Ronald B Abelson
(74) *Attorney, Agent, or Firm* — Alpine Technology Law Group LLC

(57) ABSTRACT

Briefly, in accordance with one or more embodiments, user equipment receives unicast services from a first carrier of a primary serving cell and determines if Multimedia Broadcast and Multicast services (MBMS) services are available on a second carrier based at least in part on information in a broadcast carrier channel that indicates the second carrier or an identification (ID) of the second carrier. If MBMS services are available on the second carrier, the user equipment at least temporarily switches to the second carrier to receive the MBMS services. The user equipment may provide feedback to the network or the primary serving cell when it starts and stops receiving MBMS services, and then may switch back to the primary serving cell when MBMS services have ended or the user equipment no longer desires to receive MBMS services.

35 Claims, 8 Drawing Sheets

Related U.S. Application Data

(60) Provisional application No. 61/373,788, filed on Aug. 13, 2010.

(51) Int. Cl.
*H04W 72/00* (2009.01)
*H04W 74/00* (2009.01)
*H04W 76/04* (2009.01)
*H04L 1/18* (2006.01)
*H04W 36/36* (2009.01)
*H04B 17/318* (2015.01)

(52) U.S. Cl.
CPC ............ *H04W 4/06* (2013.01); *H04W 36/36* (2013.01); *H04W 72/005* (2013.01); *H04W 74/006* (2013.01); *H04W 76/048* (2013.01)

(58) Field of Classification Search
CPC ......... H04L 5/0007; H04L 5/023; H04L 5/06; H04L 27/2662; H04L 1/1822
USPC .................... 370/328, 329, 341, 343, 480
See application file for complete search history.

(56) References Cited

U.S. PATENT DOCUMENTS

| | | | |
|---|---|---|---|
| 2004/0114598 A1* | 6/2004 | Veerepalli | H04W 99/00 370/394 |
| 2004/0116126 A1* | 6/2004 | Cave et al. | 455/450 |
| 2004/0125768 A1* | 7/2004 | Yoon | H04L 5/026 370/331 |
| 2005/0111393 A1 | 5/2005 | Jeong et al. | |
| 2006/0223450 A1 | 10/2006 | Dacosta | |
| 2008/0165806 A1 | 7/2008 | Reznik et al. | |
| 2008/0207151 A1* | 8/2008 | Rinne | H04B 7/0871 455/140 |
| 2008/0223450 A1 | 9/2008 | Kino et al. | |
| 2008/0307041 A1 | 12/2008 | Bouazizi et al. | |
| 2008/0311949 A1* | 12/2008 | Koskinen | H04W 72/005 455/525 |
| 2010/0061285 A1* | 3/2010 | Maeda | H04W 4/06 370/312 |
| 2010/0260156 A1 | 10/2010 | Lee et al. | |
| 2010/0272004 A1 | 10/2010 | Maeda et al. | |
| 2011/0002281 A1 | 1/2011 | Terry et al. | |
| 2011/0092234 A1* | 4/2011 | Kim et al. | 455/507 |
| 2011/0103309 A1* | 5/2011 | Wang | H04B 7/022 370/328 |
| 2011/0188436 A1* | 8/2011 | Damnjanovic | H04W 72/005 370/312 |
| 2011/0194428 A1* | 8/2011 | Wang | H04W 72/005 370/252 |
| 2011/0235565 A1* | 9/2011 | Wu | 370/312 |
| 2011/0243106 A1* | 10/2011 | Hsu et al. | 370/336 |
| 2011/0294435 A1* | 12/2011 | Miller | H04L 41/0893 455/67.11 |
| 2012/0003981 A1* | 1/2012 | Krishnamurthy et al. | 455/450 |
| 2012/0039229 A1 | 2/2012 | Etemad et al. | |
| 2014/0328243 A1 | 11/2014 | Etemad et al. | |
| 2015/0304917 A1 | 10/2015 | Etemad et al. | |

OTHER PUBLICATIONS

Office Action received for U.S. Appl. No. 13/154,809, dated Oct. 29, 2013, 11 pages.
Office Action received for U.S. Appl. No. 13/154,809, dated Jul. 9, 2013, 11 pages.
Office Action received for U.S. Appl. No. 13/154,809, dated Apr. 1, 2013, 10 pages.
Notice of Allowance Received for U.S. Appl. No. 14/335,179, dated Apr. 14, 2015, 15 pages.
Office Action received for U.S. Appl. No. 14/788,709, dated Oct. 21, 2016, 9 pages.

* cited by examiner

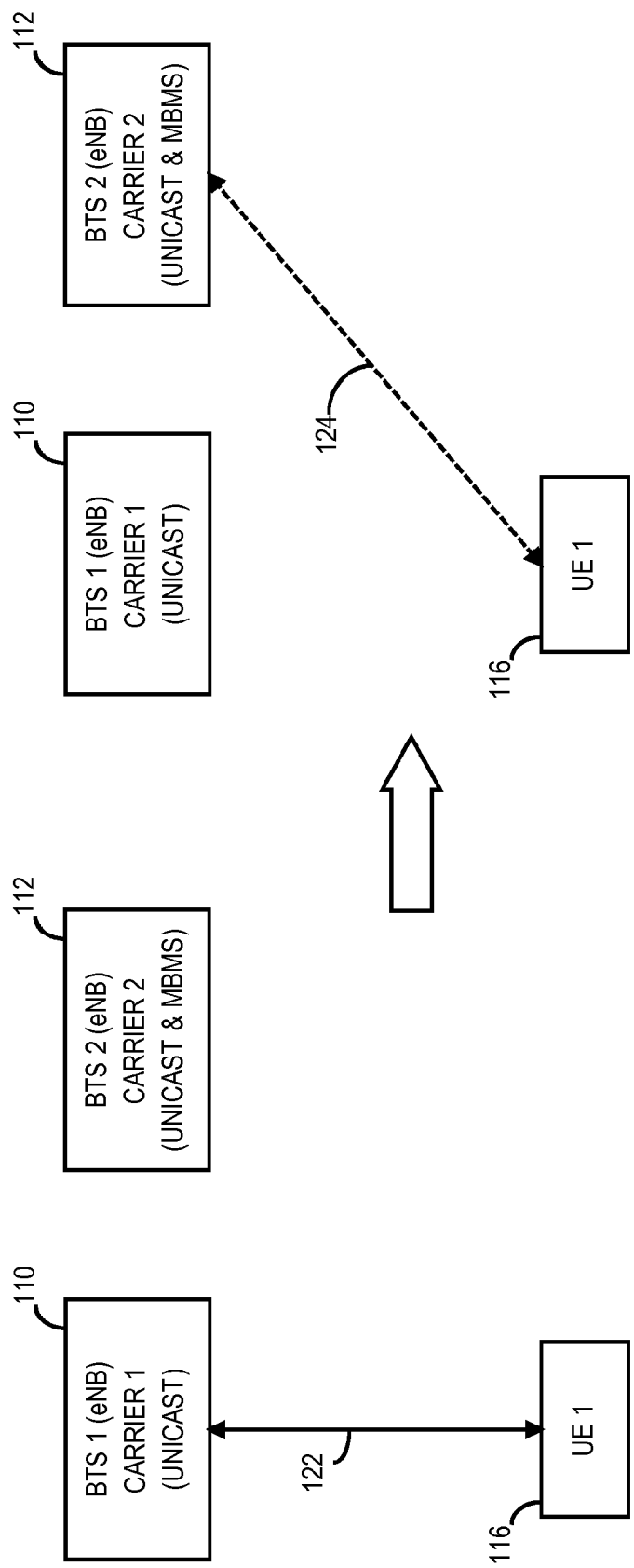

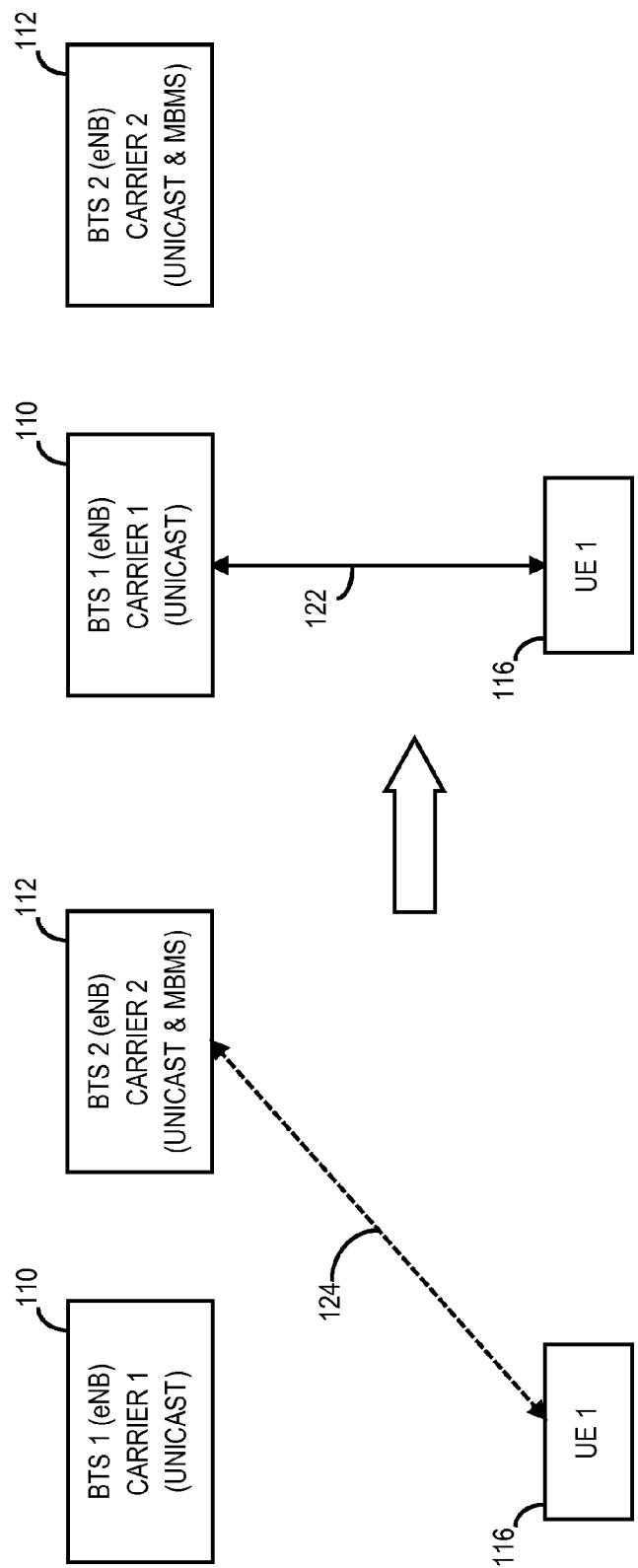

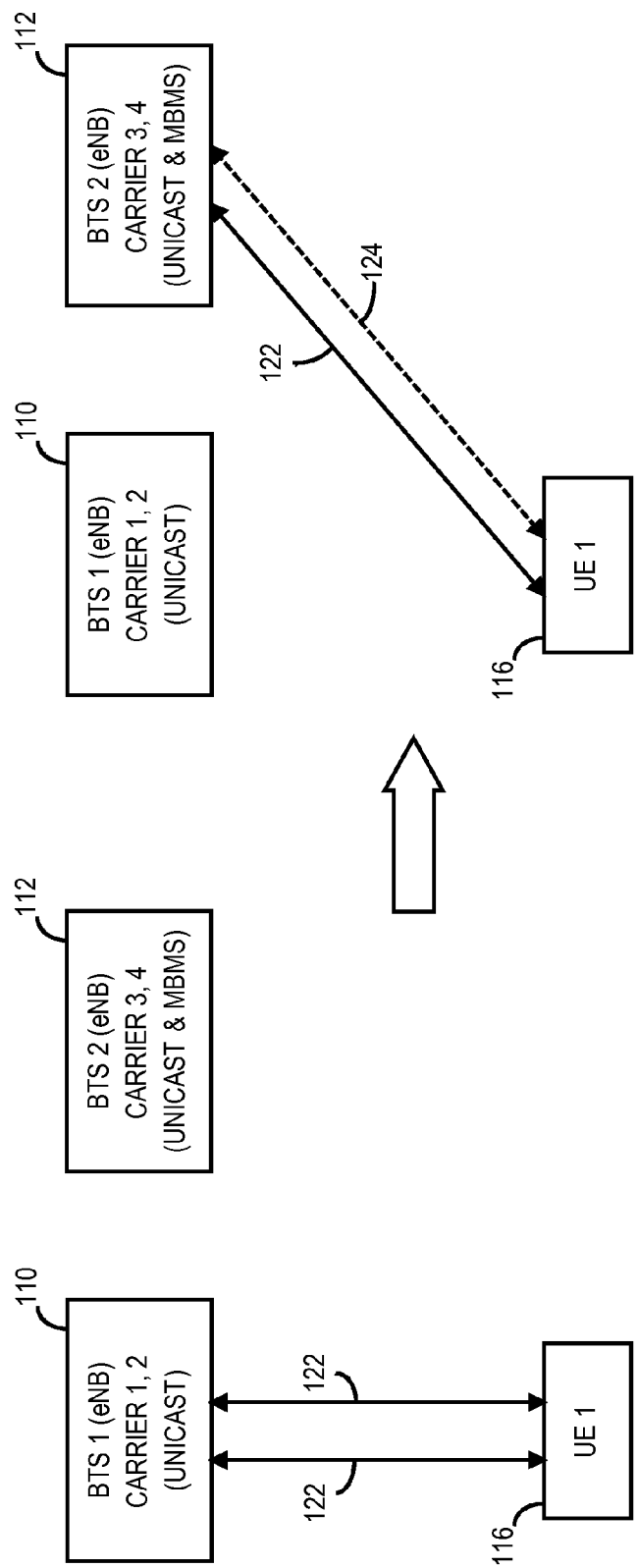

DELIVERY OF MULTICAST AND BROADCAST SERVICES CONCURRENTLY WITH UNICAST DATA

CROSS-REFERENCE TO RELATED APPLICATIONS

The present application is a continuation of U.S. application Ser. No. 13/154,809 filed Jun. 7, 2011, pending, which in turn claims the benefit of U.S. Provisional Application No. 61/373,788 filed Aug. 13, 2010. Said application Ser. No. 13/154,809 and said Application No. 61/373,788 are hereby incorporated herein in their entireties.

BACKGROUND

The next generation mobile networks, in particular Third Generation Partnership Project (3GPP) systems such as Long Term Evolution (LTE) and the evolution thereof, are expected to be deployed with multiple carriers in the same area and across multiple spectrum bands. The mobile devices or user equipment (UE) are also expected to be deployed with some devices having a single radio-frequency (RF) transceiver and other devices having multiple RF transceivers. Based on their capabilities, the devices may receive unicast traffic on a single carrier, or traffic that is aggregated across multiple carriers. Furthermore, such third generation (3G) and fourth generation (4G) systems may also provide for the delivery of Multimedia Broadcast and Multicast services (MBMS) concurrently with unicast services. Since MBMS services typically consume a significant amount of radio resources, MBMS services may be delivered from only one or a small subset of deployed carriers. In such scenarios, the MBMS bearing cells may not be the primary serving cell for some of the devices since the primary serving cell is typically determined by link quality and loading considerations. As a result, if MBMS services are desired for a device not being served by the MBMS bearing cell, handoff of the device from the primary serving cell to the MBMS cell should be accommodated.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIG. 2A and FIG. 2B are diagrams of user equipment switching from a first carrier delivering unicast services to a second carrier delivering multicast and broadcast services in accordance with one or more embodiments;

FIG. 3A and FIG. 3B are diagrams of user equipment switching from a second carrier delivering multicast and broadcast services to a first carrier delivering unicast services in accordance with one or more embodiments;

FIG. 4A and FIG. 4B are diagrams of user equipment switching from first and second carriers delivering unicast services via carrier aggregation to a third and fourth carrier delivering unicast services on the third carrier and multicast and broadcast services on the fourth carrier in accordance with one or more embodiments;

Figure 7:
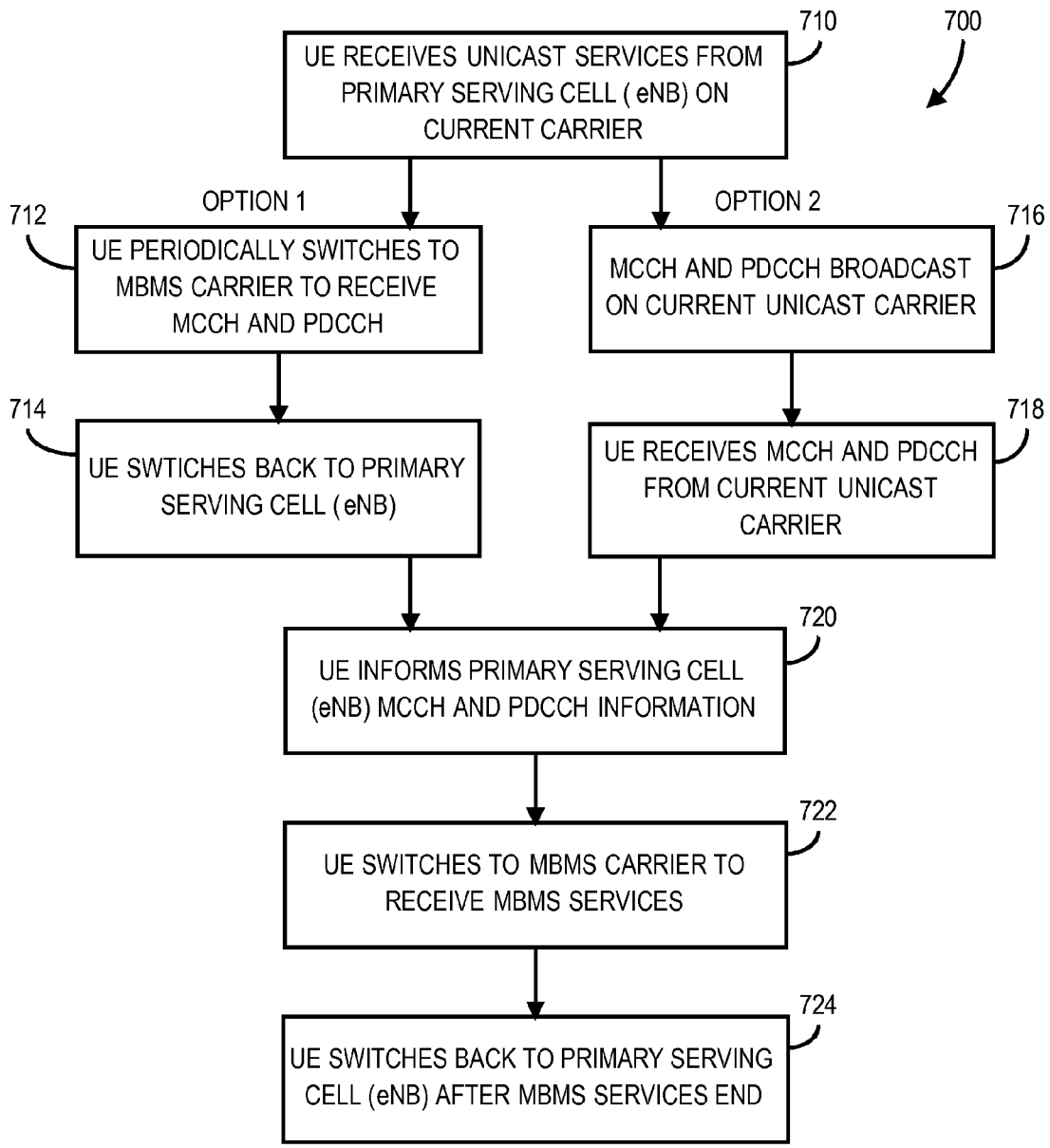
Figure 8:
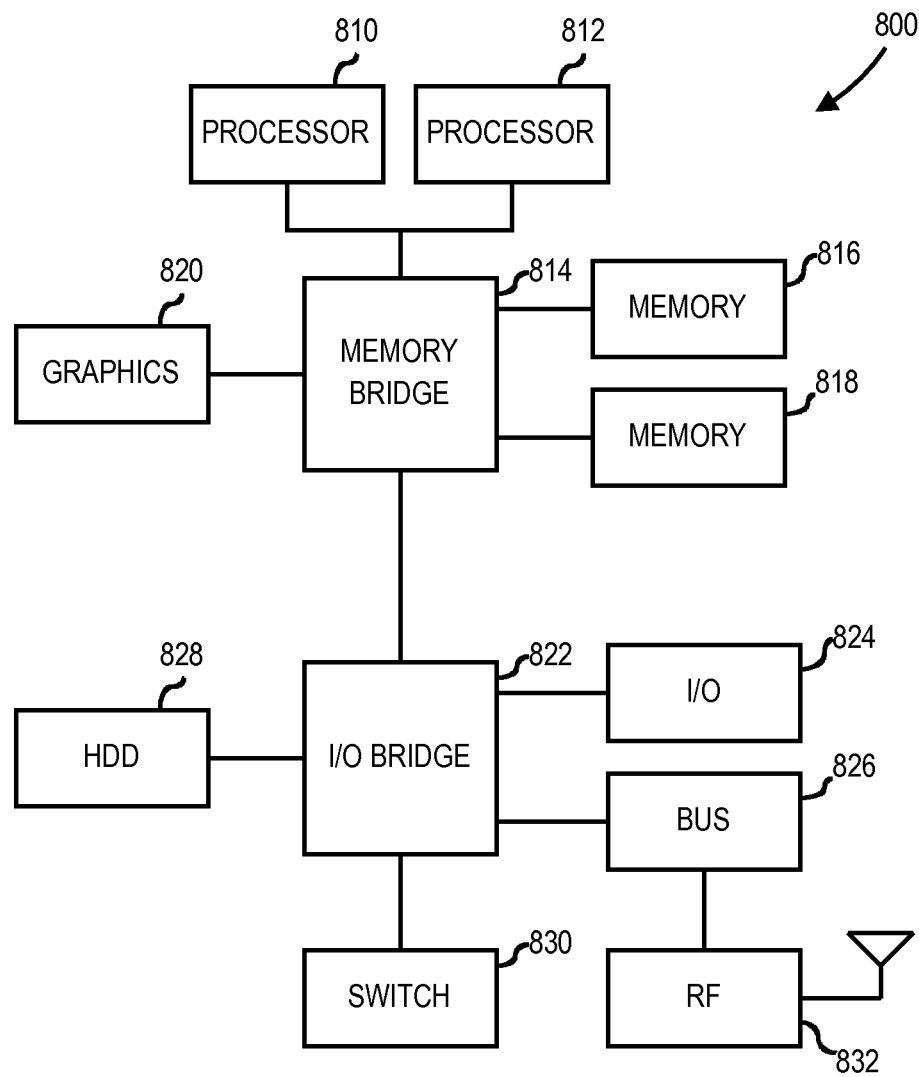

FIG. 7 is a flow diagram of a method for user equipment to inform the network when the user equipment starts and stops using multimedia and broadcast services on a carrier other than the carrier of the primary serving cell in accordance with one or more embodiments; and FIG. 8 is a block diagram of an information handling system capable of delivering and/or receiving multicast and broadcast services concurrently with unicast data in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
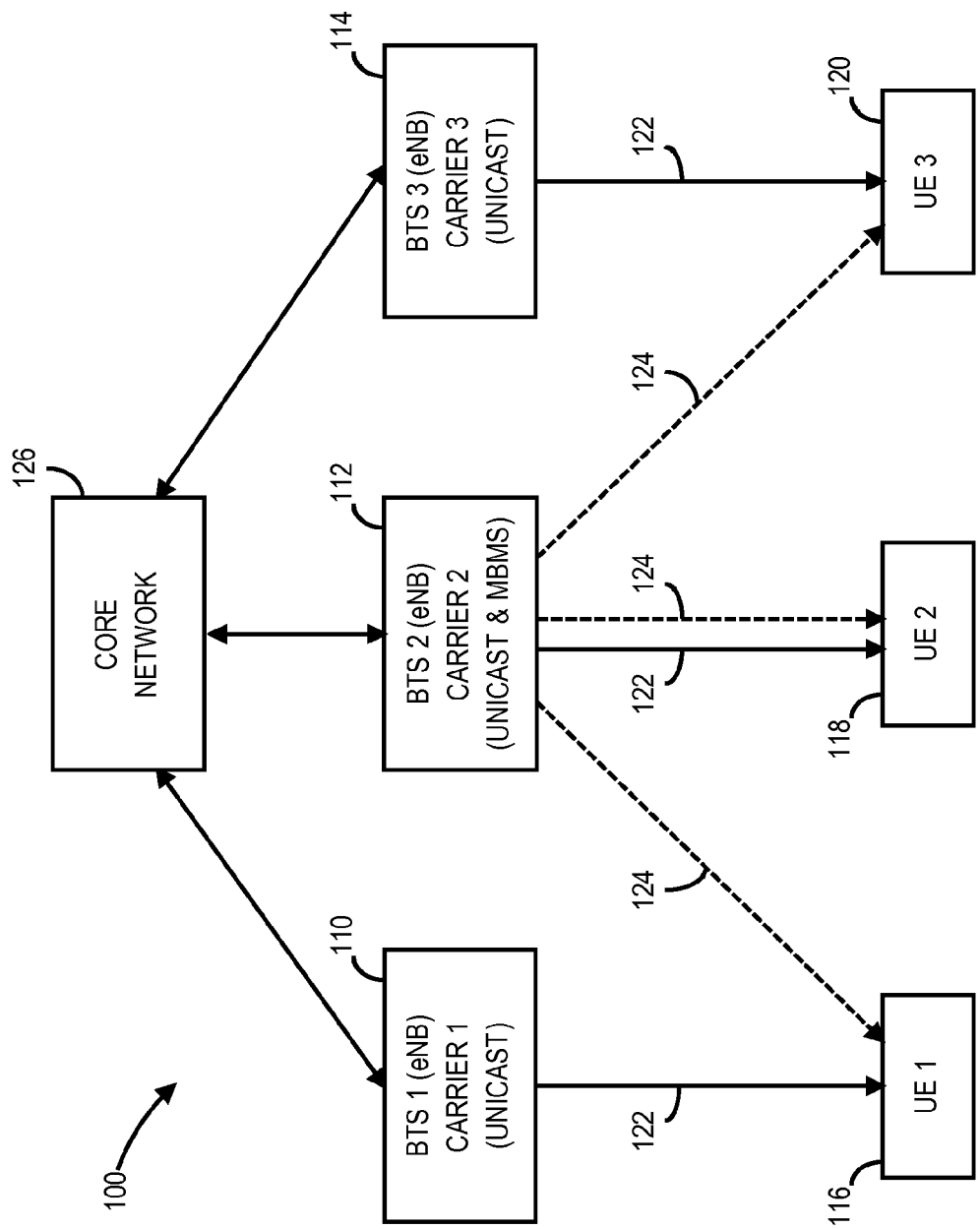
FIG. 1 is a diagram of an evolved radio access network capable of delivering multicast and broadcast services in accordance with one or more embodiments.

Referring now to FIG. 1, a diagram of an evolved radio access network capable of delivering multicast and broadcast services in accordance with one or more embodiments will be discussed. As shown in FIG. 1, a radio access network 100 may comprise one or more base transceiver stations (BTS) such as base transceiver station 110, base transceiver station 112, and base transceiver station 114 each capable of operating on a respective carrier frequency. In one or more embodiments, radio access network 100 may comprise an evolved radio access network (eRAN) for deployment in a Long Term Evolution (LTE) communication system. In such an LTE system, the base transceiver stations may comprise an evolved Node B (eNodeB or eNB) in accordance with an LTE standard as a Third Generation Partnership Project Long Term Evolution (3GPP LTE) or a 3GPP2 Air Interface Evolution (3GPP2 AIE) standard or the like. Alternatively, radio access network and the respective elements shown in FIG. 1 may be in compliance with an Institute for Electrical and Electronics Engineers (IEEE) 802.16 standard such as IEEE 802.16e or IEEE 802.16m as a Worldwide Interoperability for Microwave Access (WiMAX) or WiMAX II network. However, these are merely example standards for wireless networks, and the scope of the claimed subject matter is not limited in these respects.

As shown in FIG. 1, the base transceiver stations are capable of serving one or more respective user equipment (UE) devices such as UE 116, UE 118, and UE 120. In the example shown, out of the three base transceiver stations, BTS 110 and BTS 114, may be capable of providing unicast services 122 to UE 116 and UE 120, respectively. Unicast services may refer to transmitting or sending information, data, or other messages, to a single node or network destination that is identified by a single destination address. Base transceiver station, BTS 112, may be capable of providing unicast services to 122 to UE 118. In addition, base transceiver station BTS 112 may be capable of providing multicast and broadcast services, referred to as multimedia broadcast multicast services (MBMS) 124, to any of the user equipment. Multimedia broadcast multicast services may refer to transmitting or sending information, data, or other messages, to multiple nodes or network destinations that are identified by destination addresses. One example of MBMS services includes mobile television over a cellular communication network, however other types of MBMS services may also be implemented.

In accordance with one or more embodiments, radio access network 100 via core network 126 provides a mechanism for the user equipment devices to be informed of the availability of MBMS services on designated alternative carriers via even if those carriers are different than the primary serving cell serving that particular user equipment. Furthermore, the user equipment may utilize a mechanism to inform the core network 126 and/or its primary serving cell when the user equipment switches to and/or from another base transceiver station that is not its primary serving cell to utilize MBMS services on the other cell. By implementing both mechanisms, the base transceiver stations (enhanced NodeB, eNodeB or eNB) may perform the involved single and/or multicarrier scheduling and carrier activation to ensure seamless delivery of either unicast and/or MBMS services. An example of user equipment switching from one carrier to another to receive MBMS services is shown in and described with respect to FIG. 2A and FIG. 2B, below.

Referring now to FIG. 2A and FIG. 2B, diagrams of user equipment switching from a first carrier delivering unicast services to a second carrier delivering multicast and broadcast services in accordance with one or more embodiments will be discussed. As shown in FIG. 2A, user equipment 116 may be in communication with base transceiver station 110 on a first carrier wherein BTS 110 acts as the primary serving cell for UE 116 to provide unicast services to UE 116. In the vicinity of UE 116, base transceiver station 112 may have the capability of providing MBMS services to UE 116 although BTS 112 is not functioning as the primary serving cell for UE 116. In order for UE 116 to receive MBMS services from BTS 112, UW 116 needs to be informed when MBMS services are available and that such MBMS services are available on BTS 112 on a second carrier. In one or more embodiments, UE 116 looks for MBMS control an traffic channels on the alternate carrier. Specifically, in LTE Release-9, most of the MBMS control information is provided on a logical channel specific for MBMS common control information, the MBMS Control Channel (MCCH). If UE 116 is interested in receiving MBMS services, UE 116 reads SystemInformationBlockType13 in the Broadcast Control Channel (BCCH) which contains information to acquire the MCCH. SystemInformationBlockType13 has the following content as defined in ASN.1 syntax:

```
SystemInformationBlockType13-r9 ::= SEQUENCE {
    mbsfn-AreaInfoList-r9      MBSFN-AreaInfoList-r9,
    notificationConfig-r9      MBMS-NotificationConfig-r9
    lateR9NonCriticalExtension OCTET STRING    OPTIONAL, -- Need OP
    ...
}
```

To enable UE 116 having a single radio to receive MBMS date from carrier 2 of BTS 112 other than its primary carrier of BTS 110, SystemInformationBlockType13 may be extended in a manner such that the downlink (DL) carrier frequency of the MBMS carrier, in this example the DL carrier frequency of BTS 112, is indicated. In one or more embodiments, an example of such an extension is shown, below.

```
SystemInformationBlockType13-r9 ::= SEQUENCE {
    mbsfn-AreaInfoList-r9      MBSFN-AreaInfoList-r9,
    notificationConfig-r9      MBMS-NotificationConfig-r9
    lateR9NonCriticalExtension OCTET STRING       OPTIONAL, -- Need OP
    dl-CarrierFreq             ARFCN-ValueEUTRA,  OPTIONAL, -- Need OP
    physCellId                 PhysCellId         OPTIONAL, -- Need OP
    ...
}
```

The newly added information elements dl-CarrierFreq and physCellId are optional in one or more embodiments. When the dl-CarrierFreq information element is absent, SystemInformationBlockType13 is applicable to the current carrier, for example where the MBMS base transceiver station is also the current primary serving cell. Otherwise, SystemInformationBlockType13 indicates information pertaining to the MBMS carrier as indicated by the dl-CarrierFreq information element. Similarly, if present, the physCellId information element may be utilized to indicate the physical layer identity of the MBMS base transceiver station. As shown in FIG. 2B, UE 110 may switch to BTS 112 on the second carrier as indicted by SystemInformationBlockType13 such that UE 110 stops receiving unicast services from BTS 110 and starts receiving MBMS services 124 from BTS 112.

Referring now to FIG. 3A and FIG. 3B, diagrams of user equipment switching from a second carrier delivering multicast and broadcast services to a first carrier delivering unicast services in accordance with one or more embodiments will be discussed. As shown in FIG. 3A, user equipment 116 is in communication with base transceiver station 112 on a second carrier that is providing MBMS services 124 to the UE 116 but is not the primary serving cell for that UE 112. As shown at FIG. 3B, when the UE 116 no longer needs or desires to receive MBMS services from base transceiver station 112, UE 116 will switch from the second carrier to the first carrier wherein base transceiver station 110 provides unicast services 122 to UE 116 at the primary serving cell for UE 116.

Referring now to FIG. 4A and FIG. 4B, diagrams of user equipment switching from first and second carriers delivering unicast services via carrier aggregation to a third and fourth carrier delivering unicast services on the third carrier and multicast and broadcast services on the fourth carrier in accordance with one or more embodiments will be discussed. As shown in FIG. 4A, user equipment 116 may include two or more receivers or two or more transmitters to allow for carrier aggregation. In such an arrangement, one receiver of UE 116 may receive unicast services 122 from base transceiver station 110 over a first carrier, and the other receiver of UE 116 may receive unicast services 122 from base transceiver station 110 over a second carrier, both carriers being provided by base transceiver station 110. The BTS 110 may be considered the primary serving cell for UE 116. In the vicinity of UE 116, a second base transceiver station 112 may be capable of providing unicast services over a third carrier and MBMS services over a fourth carrier. In one or more embodiments, as shown in FIG. 4B, the UE 116 may desire to receive MBMS services at least temporarily or for a longer term. In such a case, UE 116 switches its first receiver to the third carrier of BTS 112 to receive unicast services 122 from BTS 112, and switches its second receiver to the fourth carrier of BTS 112 to receive MBMS services 124. Thus, the UE 116 may switch both of its receivers or transceivers from the first and second carriers of BTS 110 to the third and fourth carriers of BTS 112 to receive MBMS services 124 on at least one or more of the carriers of BTS 112. In some embodiments, UE 116 receives unicast services 122 on the first and second carriers of BTS 110, and then receives unicast services 122 on the third carrier from BTS 112 and MBMS services 124 on the fourth carrier of BTS 112. Alternatively, UE 116 may receive MBMS services 124 on two or more of its receivers, and the scope of the claimed subject matter is not limited in this respect. When the UE 116 is finished receiving or no longer desires to receive MBMS services 124 from BTS 112, UE 116 may switch back to BTS 110 as its primary serving cell if BTS 110 is more suited to being the primary serving cell for UE 116.

Figures 5A, 5B:
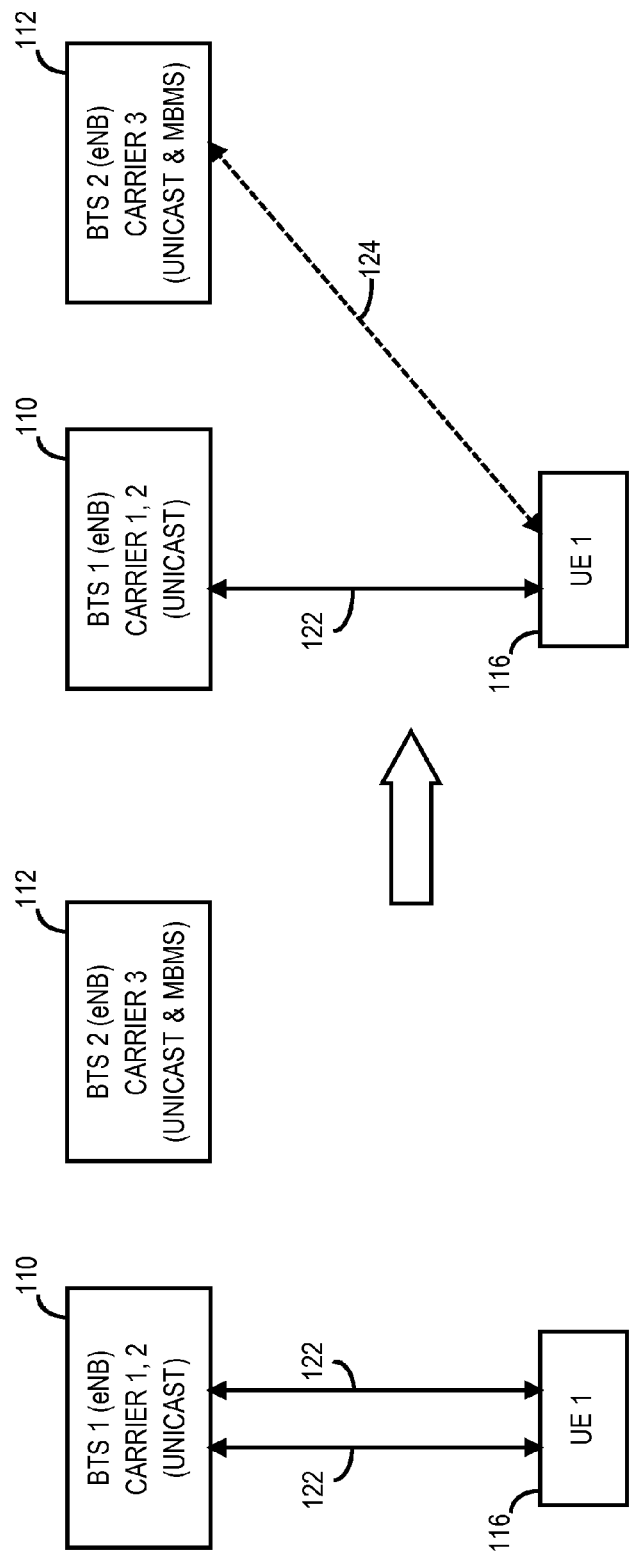
FIG. 5A and FIG. 5B are diagrams of user equipment receiving unicast services on first and second carriers via carrier aggregation and switching from the second carrier to a third carrier delivering multicast and broadcast services in accordance with one or more embodiments.

Referring now to FIG. 5A and FIG. 5B, diagrams of user equipment receiving unicast services on first and second carriers via carrier aggregation and switching from the second carrier to a third carrier delivering multicast and broadcast services in accordance with one or more embodiments will be discussed. As shown in FIG. 5A, user equipment 116 may include two or more receivers or two or more transmitters to allow for carrier aggregation. In such an arrangement, one receiver of UE 116 may receive unicast services 122 from base transceiver station 110 over a first carrier, and the other receiver of UE 116 may receive unicast services 122 from base transceiver station 110 over a second carrier, both carriers being provided by base transceiver station 110. The BTS 110 may be considered the primary serving cell for UE 116. In the vicinity of UE 116, a second base transceiver station 112 may be capable of providing MBMS services over a third carrier. In one or more embodiments, as shown in FIG. 4B, the UE 116 may desire to receive MBMS services at least temporarily or for a longer term. In such a case, UE 116 may switch one of its receivers to from the second carrier on BTS 110 to the third carrier on BTS 112, while keeping the other of its receivers on the first carrier of BTS 112. Thus, as shown in FIG. 5B, one receiver of UE 116 stays in communication with base transceiver station 110 on the first carrier to receive unicast services 122 from BTS 110, and the other receiver of UE 116 switches from the second carrier to the third carrier to receive MBMS services 124 from BTS 112. In some embodiments, where UE 116 has several receivers or transceivers, UE may keep one, two or more receivers in communication with BTS 110 to receive unicast services 122 from BTS 110 on a first group of carriers, and may switch one, two or more receivers to communicate with BTS 112 to receive MBMS services 124 from BTS 112 on a second group of carriers, although the scope of the claimed subject matter is not limited in this respect. When the UE 116 is finished receiving or no longer desires to receive MBMS services 124 from BTS 112, UE 116 may switch back to BTS 110 as its primary serving cell if BTS 110 is suited to being the primary serving cell for UE 116.

Figure 6:
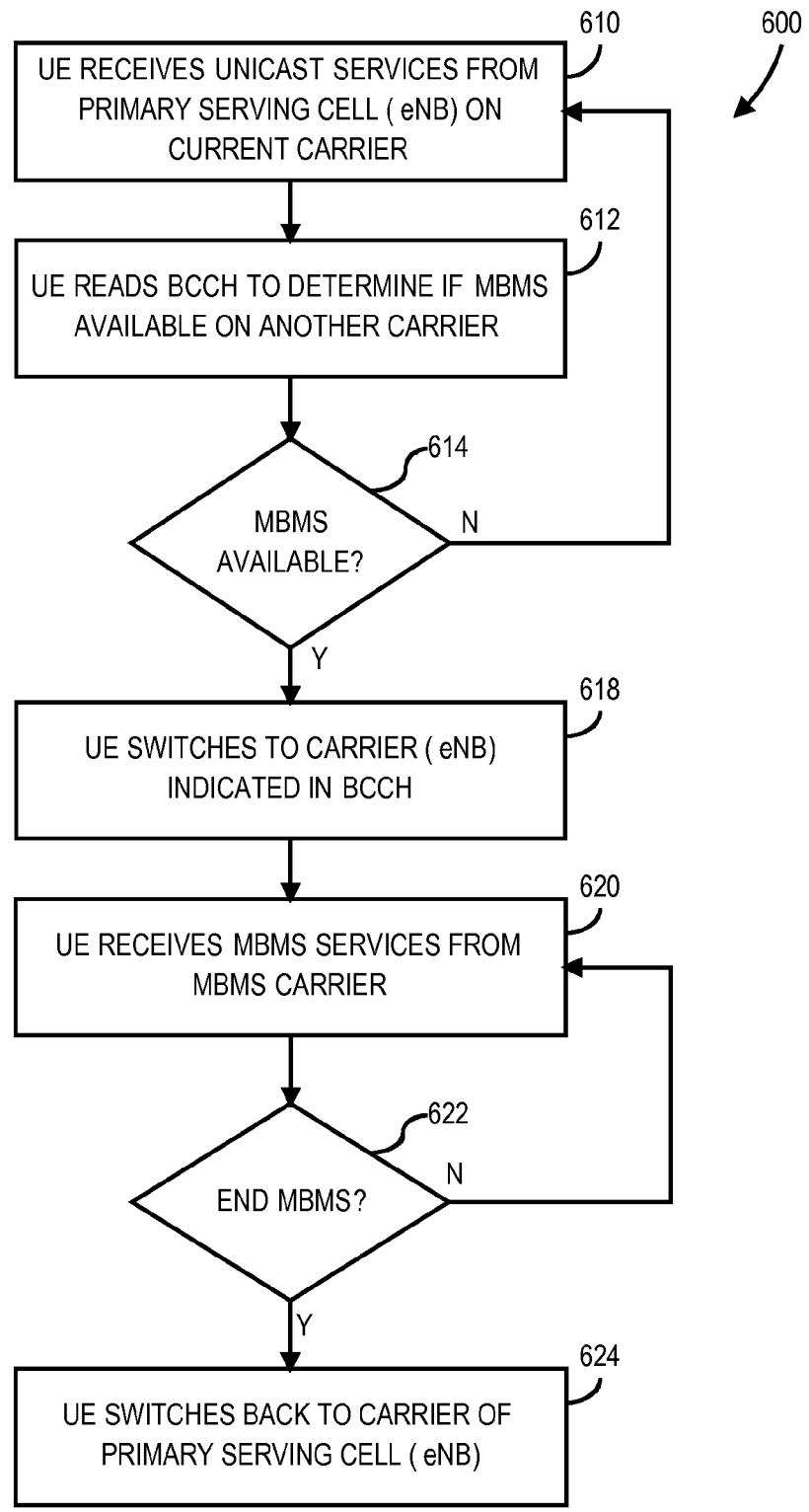
FIG. 6 is a flow diagram of a method to inform user equipment of the availability of multicast and broadcast services on another carrier in accordance with one or more embodiments.

Referring now to FIG. 6, a flow diagram of a method to inform user equipment of the availability of multicast and broadcast services on another carrier in accordance with one or more embodiments. As shown in FIG. 6, method 600 may include more or fewer blocks, and/or in one or more alternative orders, than shown, and the scope of the claimed subject matter is not limited in these respects. At block 610, user equipment (UE) receives unicast services from its primary serving cell, for example a base transceiver station or an enhanced Node B (eNB), on a current carrier. At 612, the user equipment reads the broadcast control channel (BCCH) to determine if MBMS is available on another carrier, the MBMS carrier. If MBMS is not available as determined at decision block 614, then the user equipment continues to receive unicast services from the primary serving cell. Otherwise, if MBMS is available, the user equipment switches at block 618 to the carrier of the base transceiver station or eNB on which MBMS is available as indicated in the BCCH. The user equipment then receives MBMS services from the MBMS carrier. As determined at decision block 622, the user equipment continues to receive MBMS services until the end of the MBMS services or until the user equipment no longer desires to receive MBMS services, at which time the user equipment then switches at block 624 back to carrier of the primary serving cell (eNB). Alternatively, if another carrier, cell, base transceiver station, eNB, and so on, is a better candidate to be the primary serving cell based on channel conditions, signal strength, loading, and so on, the user equipment may switch to the better suited carrier or device, although the scope of the claimed subject matter is not limited in this respect.

Referring now to FIG. 7, a flow diagram of a method for user equipment to inform the network when the user equipment starts and stops using multimedia and broadcast services on a carrier other than the carrier of the primary serving cell in accordance with one or more embodiments will be discussed. As shown in FIG. 7, method 700 may include more or fewer blocks, and/or in one or more alternative orders, than shown, and the scope of the claimed subject matter is not limited in these respects. In one or more embodiments, a feedback mechanism is provided from the user equipment to the base transceiver station or enhanced Node B (eNB) to indicate when a UE starts and/or stops active reception of specific MBMS services on another carrier. Such a feedback mechanism may be designed using the same messaging used for MBMS counting purposes, or alternatively the feedback mechanism may be designed as a separate message. In order to reduce or minimize uplink signaling, the transmission of uplink feedback from the user equipment to the base transceiver station may be allowed if the UE is subscribed to an active MBMS service, the UE is using the MBMS service, the MBMS data is transmitted on a carrier other than the carrier UE's primary serving cell, and the UE cannot receive the MBMS bearing carrier without temporarily leaving its serving cell, or one of its active serving cells when carrier aggregation is used. In some embodiments, the feedback message may comprise a media access control (MAC) Control Element or a radio resource control (RRC) message in which the MBMS content identification (ID) or its equivalent for all content that the user equipment is actively using is indicated. Since the base transceiver station (eNB) is aware of the scheduling times for the MBMS service content, the primary serving cell base transceiver station can avoid transmitting unicast traffic to the user equipment on the subframe where that MBMS content is transmitted. The user equipment may also indicate to the base transceiver station (eNB) when the user equipment stops receiving the MBMS service so the scheduling of unicast traffic can be performed with fewer restrictions to give the user equipment a sufficient quality of experience and also helping with overall system efficiency. Even for UEs with multiple RF receivers or transceivers with carrier aggregation capability, such feedback may be involved if the MBMS bearing cell is not the serving cell for the UE. In such a case, the base transceiver station (eNB) may change the secondary serving of the UE to the MBMS bearing carrier or just avoid scheduling on the secondary carrier during the transmission of the UE's active MBMS services.

At block 710, the user equipment receives unicast services from a primary serving cell (eNB) on a current carrier. In one or more embodiments, the carrier where the UE is receiving unicast data is denoted as the serving carrier associated with the serving cell. In carrier aggregation, the serving carrier is referred to as the Downlink Primary Component Carrier (DL PCC) associated with the primary cell of the user equipment. In addition, the time when the UE switches to the MBMS bearing carrier to receive MBMS data and/or control information is denoted as switching time. In Release 9 of the Long Term Evolution standard (LTE Rel-9), an MBMS Control Channel (MCCH) is used to convey the control information relevant for MBMS. The MCCH could also be used for counting in Release 10 of the Long Term Evolution standard (LTE Rel-10). In addition, the Physical Downlink Control Channel Physical Downlink Control Channel (PDCCH) may be used to inform UEs about the changing of MCCH information. These channels are transmitted in the MBMS bearing carrier.

In one or more embodiments, to facilitate the switching between the serving carrier and MBMS bearing carrier, two options may be implemented. In the first option, overhead may be reduced or minimized. In the second option, switching time may be reduced or minimized. In one or more embodiments, the first option involves reducing or minimizing overhead. In such embodiments, the MCCH and its relevant PDCCH transmission are not sent in the serving carrier. As a result, the control channel overhead is reduced or minimized. In this option, at block 712 the UE switches periodically to the MBMS bearing carrier to receive MCCH and PDCCH if needed. For example, a UE that is receiving an MBMS service shall switch to MBMS bearing carrier to acquire the MCCH information from the start of each modification period. After checking the MCCH and PDCCH information on the MBMS bearing carrier, the UE switches back at block 714 to the carrier of the primary servicing cell. A UE that is not receiving an MBMS service, as well as UEs that are receiving an MBMS service but that are potentially interested in receiving other services not yet started in another MBSFN area, verifies that the stored MCCH information remains valid by attempting periodically to switch at block 712 to MBMS bearing carrier to find the MCCH information change notification carried in PDCCH in the configured timings. In this option, there is no additional MBMS related overhead in unicast carriers. However, the UE switches to the MBMS carriers more frequently.

In one or more embodiments, the second option reduces or minimizes switching time, that is, the occasion to switch to MBMS bearing carrier and/or duration of staying in such carrier. In this option, MBMS related control information is transmitted at block 716 in the primary serving cell for unicast service as well. At block 718, the UE monitors the MCCH and PDDCH channels in the primary serving cell instead of reading them on MBMS bearing carrier and it switches to MBMS carrier only to receive MBMS data. This option, while slightly adding higher overhead in the unicast channel, reduces the amount of time the UE may be absent from its primary serving cell and therefore has less impact on scheduling throughput efficiency of unicast traffic. The tradeoff for reduced or minimized switching time is increased overhead. For example, in one or more embodiments the SystemInformationBlockType13 is transmitted in the unicast carrier to indicate the information of MBMS carrier, the MCCH is utilized to provide control information, and/or to count carrier switching UEs, and the PDCCH to is utilized notify any changes of the MCCHs.

Under both options, when the UE is ready to switch to an MBMS bearing carrier, the UE informs the primary serving cell (eNB) at block 720 of the MCCH and PDCCH information for the UE switching to the MBMS bearing carrier. At block 722, the UE switches to the MBMS carrier to receiver MBMS services. At the end of the MBMS services, or if the UE no longer desires to receive MBMS services, the UE switches back to the primary serving cell (eNB), or to a serving cell that is suited to be the primary serving cell.

In general, having prior knowledge of subframes where the UE is expected to receive MBMS data, and the fact that such subframes are relatively infrequent, for example one subframe about every 200 seconds to about every 500 milliseconds, allows the base transceiver station (eNB) to configure discontinuous reception (DRX) and hybrid automatic repeat request (Hybrid ARQ or HARQ) timing to avoid any conflicts between unicast and MBMS transmissions, and impacts on quality of service (QoS). The base transceiver station (eNB) may also move the primary serving cell of UE to the carrier/cell where MBMS data is transmitted if the MBMS carrier/cell can be efficiently used for unicast traffic from link quality and loading perspectives. In any event, to ensure consistent system operation even in worse case scenarios, some provisions and configuration rules may be implemented to address priority rules for possible conflicts with other features, however the scope of the claimed subject matter is not limited in this respect. Such other features include, but are not limited to measurement gap, DRX, or HARQ, or combinations thereof. If the UE is configured with measurement gap and switching time is overlapped with the measurement gap, the UE uses measurement gap for the configured measurement instead of switching to the MBMS bearing carrier. The reason for this arrangement is that measurement gap is configured to support mobility, which is utilized for mobile operation. If the UE is configured with DRX, and the DRX active time is overlapped with switching time, there are two options to handle the scenario. In the first option, the UE still monitors PDCCH during the active time instead of switching to the MBMS bearing carrier. In this arrangement, the UE only switches to the MBMS service when not in the active time of DRX. In a second option, the UE switches to the MBMS subframes of the MBMS bearing carrier when scheduled even during the Active Time of DRX. For HARQ, ongoing HARQ retransmissions may occur either in the downlink (DL) or the uplink (UL) that are overlapped with the switching time. In a first option, the UE switches to the MBMS bearing carrier, and unicast retransmissions are put on hold until the UE switches back to MBMS serving carrier. In a second option, the UE stays in serving carrier to finish HARQ retransmissions. In some embodiments, different options can be configured for DL HARQ and UL HARQ, although the scope of the claimed subject matter is not limited in these respects.

Referring now to FIG. 8, a block diagram of an information handling system capable of delivering and/or receiving multicast and broadcast services concurrently with unicast data in accordance with one or more embodiments. Information handling system 800 of FIG. 8 may tangibly embody one or more of any of the network elements of radio access network 100 as shown in and described with respect to FIG. 1. For example, information handling system 800 may represent the hardware of base transceiver station 110 and/or user equipment 116, with greater or fewer components depending on the hardware specifications of the particular device or network element. Although information handling system 800 represents one example of several types of computing platforms, information handling system 800 may include more or fewer elements and/or different arrangements of elements than shown in FIG. 8, and the scope of the claimed subject matter is not limited in these respects.

Information handling system 800 may comprise one or more processors such as processor 810 and/or processor 812, which may comprise one or more processing cores in a single processor. One or more of processor 810 and/or processor 812 may couple to one or more memories 816 and/or 818 via memory bridge 814, which may be disposed external to processors 810 and/or 812, or alternatively at least partially disposed within one or more of processors 810 and/or 812. Memory 816 and/or memory 818 may comprise various types of semiconductor based memory, for example volatile type memory and/or non-volatile type memory. Memory bridge 814 may couple to a graphics system 820 to drive a display device (not shown) coupled to information handling system 500.

Information handling system 800 may further comprise input/output (I/O) bridge 822 to couple to various types of I/O systems. I/O system 824 may comprise, for example, a universal serial bus (USB) type system, an IEEE 1394 type system, or the like, to couple one or more peripheral devices to information handling system 800. Bus system 826 may comprise one or more bus systems such as a peripheral component interconnect (PCI) express type bus or the like, to connect one or more peripheral devices to information handling system 800. A hard disk drive (HDD) controller system 828 may couple one or more hard disk drives or the like to information handling system, for example Serial ATA type drives or the like, or alternatively a semiconductor based drive comprising flash memory, phase change, and/or chalcogenide type memory or the like. Switch 830 may be utilized to couple one or more switched devices to I/O bridge 822, for example Gigabit Ethernet type devices or the like. Furthermore, as shown in FIG. 8, information handling system 800 may include a radio-frequency (RF) block 832 comprising RF circuits and devices for wireless communication with other wireless communication devices and/or via wireless networks such as radio access network 100 of FIG. 1, for example where information handling system 500 embodies base transceiver station 110 and/or user equipment 116, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to delivery of multicast and broadcast services concurrently with unicast data and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A user equipment (UE) configured to:
   receive a system information block (SIB) from an evolved Universal Mobile Telecommunications System (UMTS) Terrestrial Radio Access Network (EUTRAN) indicating an identified carrier frequency on which Multimedia Broadcast Multicast Services (MBMS) services are available;
   inform the EUTRAN that the UE will receive MBMS services on the identified carrier frequency;
   receive a message from the EUTRAN changing secondary serving of the UE to a cell providing MBMS services while the UE is receiving MBMS services; and
   receive MBMS services on the identified carrier frequency indicated in the SIB.

2. A user equipment as claimed in claim 1, wherein the SIB comprises a SystemInformationBlockType13 information element transmitted in a broadcast control channel (BCCH).

3. A user equipment as claimed in claim 1, wherein the SIB further indicates a physical layer identifier of a cell providing the MBMS services.

4. A user equipment as claimed in claim 1, wherein the UE is further configured to notify the EUTRAN when the UE is no longer receiving MBMS services on the identified carrier.

5. A user equipment as claimed in claim 1, wherein the UE is further configured to send a feedback message to the EUTRAN as a media access control (MAC) Control Element or a radio resource control (RRC) message regarding the MBMS services.

6. A user equipment as claimed in claim 1, wherein the UE is further configured to receive MBMS services from a cell other than its primary serving cell.

7. A user equipment as claimed in claim 1, wherein the UE is further configured to not receive unicast information from the EUTRAN while the UE is receiving MBMS services.

8. A user equipment as claimed in claim 1, wherein the UE is further configured to receive MBMS control channel (MCCH) information and Physical Downlink Control Channel Physical Downlink Control Channel (PDDCH) information from a cell providing MBMS services.

9. A user equipment as claimed in claim 1, wherein the UE is further configured to receive MBMS control channel (MCCH) information and Physical Downlink Control Channel Physical Downlink Control Channel (PDDCH) information from its primary serving cell.

10. An apparatus of a user equipment (UE), comprising:
one or more processors to decode a system information block (SIB) from an evolved Universal Mobile Telecommunications System (UMTS) Terrestrial Radio Access Network (EUTRAN) indicating an identified carrier frequency on which Multimedia Broadcast Multicast Services (MBMS) services are available, generate a message to inform the EUTRAN that MBMS services will be received on the identified carrier frequency, and cause the UE to receive MBMS services on the identified carrier frequency indicated in the SIB, wherein the one or more processors are to cause the UE to stop active reception of unicast information from the EUTRAN while receiving MBMS services; and
a memory to store the SIB.

11. The apparatus of claim 10, wherein the SIB comprises a SystemInformationBlockType13 information element transmitted in a broadcast control channel (BCCH).

12. The apparatus of claim 10, wherein the SIB further indicates a physical layer identifier of a cell providing the MBMS services.

13. The apparatus of claim 10, wherein the one or more processors are to generate a message to notify the EUTRAN when MBMS services are no longer being received on the identified carrier.

14. The apparatus of claim 10, wherein the one or more processors are to generate a feedback message for the EUTRAN as a media access control (MAC) Control Element or a radio resource control (RRC) message regarding the MBMS services.

15. The apparatus of claim 10, wherein the one or more processors are to cause the UE to receive MBMS services from a cell other than a primary serving cell.

16. The apparatus of claim 10, wherein the one or more processors are to decode a message received from the EUTRAN changing secondary service to a cell providing MBMS services while receiving MBMS services.

17. The apparatus of claim 10, wherein the one or more processors are to decode MBMS control channel (MCCH) information and Physical Downlink Control Channel Physical Downlink Control Channel (PDDCH) information received from a cell providing MBMS services.

18. The apparatus of claim 10, wherein the one or more processors are to decode MBMS control channel (MCCH) information and Physical Downlink Control Channel Physical Downlink Control Channel (PDDCH) information received from a primary serving cell.

19. One or more non-transitory storage media having instructions stored thereon that, if executed by a user equipment (UE), result in:
receiving a system information block (SIB) from an evolved Universal Mobile Telecommunications System (UMTS) Terrestrial Radio Access Network (EUTRAN) indicating an identified carrier frequency on which Multimedia Broadcast Multicast Services (MBMS) services are available;
informing the EUTRAN that MBMS services will be received on the identified carrier frequency;
receiving a message from the EUTRAN changing secondary service to a cell providing MBMS services while receiving MBMS services; and
receiving MBMS services on the identified carrier frequency indicated in the SIB.

20. The one or more non-transitory storage media as claimed in claim 19, wherein the SIB comprises a SystemInformationBlockType13 information element transmitted in a broadcast control channel (BCCH).

21. The one or more non-transitory storage media as claimed in claim 19, wherein the SIB further indicates a physical layer identifier of a cell providing the MBMS services.

22. The one or more non-transitory storage media as claimed in claim 19, wherein the instructions, if executed, further result in notifying the EUTRAN when MBMS services are no longer being received on the identified carrier.

23. The one or more non-transitory storage media as claimed in claim 19, wherein the instructions, if executed, further result in sending a feedback message to the EUTRAN as a media access control (MAC) Control Element or a radio resource control (RRC) message regarding the MBMS services.

24. The one or more non-transitory storage media as claimed in claim 19, wherein the instructions, if executed, further result in receiving MBMS services from a cell other than a primary serving cell.

25. The one or more non-transitory storage media as claimed in claim 19, wherein the instructions, if executed, further result in causing the UE to stop active reception of unicast information from the EUTRAN while receiving MBMS services.

26. The one or more non-transitory storage media as claimed in claim 19, wherein the instructions, if executed, further result in receiving MBMS control channel (MCCH) information and Physical Downlink Control Channel Physical Downlink Control Channel (PDDCH) information from a cell providing MBMS services.

27. The one or more non-transitory storage media as claimed in claim 19, wherein the instructions, if executed, further result in receiving MBMS control channel (MCCH) information and Physical Downlink Control Channel Physical Downlink Control Channel (PDDCH) information from a primary serving cell.

28. An apparatus of an evolved Node B (eNB), comprising:
one or more processors to send a system information block (SIB) to a user equipment (UE) indicating an identified carrier frequency on which Multimedia Broadcast Multicast Services (MBMS) services are available, receive a message from the UE that the UE will receive MBMS services on the identified carrier frequency, receive a notification from the UE that the UE is no longer receiving MBMS services on the identified carrier frequency, maintain a unicast connection with the UE while the UE periodically switches to receive MBMS control channel (MCCH) information and Physical Downlink Control Channel Physical Downlink Control Channel (PDDCH) information from a cell providing MBMS services; and
a memory to store the message from the UE.

29. The apparatus of an evolved Node as claimed in claim 28, wherein the SIB comprises a SystemInformationBlockType13 information element transmitted in a broadcast control channel (BCCH).

30. The apparatus of an evolved Node as claimed in claim 28, wherein the SIB further indicates a physical layer identifier of a cell providing the MBMS services.

31. The apparatus of an evolved Node as claimed in claim 28, wherein the one or more processors are to decode a feedback message from the UE as a media access control (MAC) Control Element or a radio resource control (RRC) message regarding the MBMS services.

32. The apparatus of an evolved Node B as claimed in claim 28, wherein the one or more processors are to cause the eNB to stop active sending of unicast information to the UE while the UE is receiving MBMS services.

33. The apparatus of an evolved Node B as claimed in claim 28, wherein the one or more processors are to generate unicast information for the UE while the UE is receiving MBMS services.

34. The apparatus of an evolved Node B as claimed in claim 28, wherein the one or more processors are to generate a message for the UE changing secondary serving of the UE to a cell providing MBMS services while the UE is receiving MBMS services.

35. The apparatus of an evolved Node B as claimed in claim 28, wherein the one or more processors are to generate MBMS control channel (MCCH) information and Physical Downlink Control Channel Physical Downlink Control Channel (PDDCH) information for the UE.

* * * * *